(12) United States Patent
Gondek et al.

(10) Patent No.: US 7,188,943 B2
(45) Date of Patent: Mar. 13, 2007

(54) INK SET FOR INKJET PRINTING

(75) Inventors: Jay S Gondek, Camas, WA (US); Charles G. Dupuy, Corvallis, OR (US); Alexey S Kabalnov, Corvallis, OR (US); Matthew A. Shepherd, Vancouver, WA (US)

(73) Assignee: Hewlett-Packard Development Company, LP., Houston, TX (US)

( * ) Notice: Subject to any disclaimer, the term of this patent is extended or adjusted under 35 U.S.C. 154(b) by 264 days.

(21) Appl. No.: 10/891,628

(22) Filed: Jul. 14, 2004

(65) Prior Publication Data

US 2006/0012655 A1    Jan. 19, 2006

(51) Int. Cl.
    *G01D 11/00* (2006.01)
(52) U.S. Cl. .................................................... 347/100
(58) Field of Classification Search ................ 347/100
    See application file for complete search history.

(56) References Cited

U.S. PATENT DOCUMENTS

| | | | |
|---|---|---|---|
| 5,108,504 A | 4/1992 | Johnson et al. | |
| 5,118,350 A | 6/1992 | Prasad | |
| 5,143,547 A | 9/1992 | Kappele | |
| 5,145,519 A | 9/1992 | Kappele | |
| 5,185,034 A | 2/1993 | Webb et al. | |
| 5,273,573 A | 12/1993 | Kappele | |
| 5,451,251 A * | 9/1995 | Mafune et al. | 106/31.48 |
| 5,461,405 A * | 10/1995 | Lehmann et al. | 347/49 |
| 5,534,051 A | 7/1996 | Lauw | |
| 5,745,120 A | 4/1998 | De Baer et al. | |
| 5,772,742 A | 6/1998 | Wang | |
| 5,851,273 A | 12/1998 | Morris et al. | |
| 5,858,075 A | 1/1999 | Deardurff et al. | |
| 5,888,284 A | 3/1999 | Engel | |
| 6,001,161 A | 12/1999 | Evans et al. | |
| 6,053,969 A | 4/2000 | Lauw et al. | |
| 6,168,892 B1 | 1/2001 | Ohara et al. | |
| 6,183,548 B1 | 2/2001 | Erdtmann et al. | |
| 6,254,217 B1 * | 7/2001 | Askeland et al. | 347/43 |
| 6,290,762 B1 * | 9/2001 | Elwakil | 106/31.27 |
| 6,402,823 B1 | 6/2002 | Garcia Sainz et al. | |
| 6,459,501 B1 | 10/2002 | Holmes | |
| 6,508,549 B1 | 1/2003 | Romano, Jr. et al. | |

(Continued)

FOREIGN PATENT DOCUMENTS

| | | |
|---|---|---|
| EP | 1 219 689 A | 7/2002 |
| EP | 1 559 758 A | 8/2005 |
| JP | 2000273374 | 10/2000 |
| JP | 2000336294 | 12/2000 |

OTHER PUBLICATIONS

Anon, "Scitex Follows the Sign of the Times with Billboard Poster Printer", Lithow eek, vol. 16, No. 28, Jul. 14, 1992, (Abstract, 1 pg.).
Eggleston P, "The Future of Color Pinting: Beyond CMYK", Adv. Imaging, vol. 16, No. 4, Apr. 2001, (Abstract, 1 pg.).
Clariant, "The Source of Ink Jet Printing Excellence" (DP 8518 E), Sep. 2003, (24 pgs.).

*Primary Examiner*—Manish S. Shah
*Assistant Examiner*—Laura E. Martin (57) ABSTRACT

An ink set for inkjet printing includes a cyan ink having a first lightness value, a magenta ink having a second lightness value, and a blue ink having a third lightness value, wherein the cyan ink and the magenta ink mix to form a composite blue having a fourth lightness value, wherein the fourth lightness value is approximately twice the third lightness value.

31 Claims, 4 Drawing Sheets

U.S. PATENT DOCUMENTS

| | | |
|---|---|---|
| 6,521,030 B1 | 2/2003 | Stoffel |
| 6,540,329 B1 | 4/2003 | Kaneko et al. |
| 6,540,821 B2 | 4/2003 | Adamic et al. |
| 6,582,070 B2 | 6/2003 | Takada et al. |
| 6,610,130 B2 | 8/2003 | Engel |
| 6,682,589 B2 | 1/2004 | Morris et al. |
| 6,695,444 B2 | 2/2004 | Leu et al. |
| 2001/0008109 A1* | 7/2001 | Banning et al. ......... 106/31.75 |
| 2001/0027734 A1 | 10/2001 | Geisenberger et al. |
| 2002/0109764 A1* | 8/2002 | Hale et al. ................. 347/100 |
| 2003/0007023 A1 | 1/2003 | Barclay et al. |
| 2003/0061963 A1* | 4/2003 | Blease et al. ............ 106/31.27 |
| 2003/0110980 A1 | 6/2003 | Thornberry et al. |
| 2003/0159616 A1 | 8/2003 | Wang et al. |
| 2003/0189626 A1 | 10/2003 | Kataoka et al. |
| 2004/0035320 A1 | 2/2004 | Sano et al. |

* cited by examiner

INK SET FOR INKJET PRINTING

CROSS-REFERENCE TO RELATED APPLICATIONS

This application is related to U.S. patent application Ser. No. 10/891,760, filed on Jul. 14, 2004, assigned to the assignee of the present invention, and incorporated herein by reference.

BACKGROUND

An inkjet printing system may include a printhead and an ink supply which supplies liquid ink to the printhead. The printhead ejects ink drops through a plurality of orifices or nozzles and toward a print media, such as a sheet of paper, so as to print onto the print media. Typically, the nozzles are arranged in one or more arrays such that properly sequenced ejection of ink from the nozzles causes characters or other images to be printed upon the print media as the printhead and the print media are moved relative to each other.

In general, inkjet inks are either dye-based or pigment-based. Both are typically prepared in an ink vehicle that contains the dye and/or the pigment. Dye-based inkjet inks generally use a colorant which is dissolved in the ink vehicle and pigment-based inks generally use a colorant that is insoluble in the ink vehicle, but suspended or dispersed in the form of small particles.

Perceived color quality of inkjet inks can be characterized using any one of several color space systems, such as Munsell or CIELAB, as is well known in the art. With respect to the Munsell color space, a given color is defined using three terms, namely Hue (H), Value (V), and Chroma (C). With respect to the CIELAB color space, a color is defined using three terms $L^*$, $a^*$, and $b^*$. With the CIELAB system, $L^*$ defines the lightness of a color and ranges from 0 (black) to 100 (white). In addition, the terms $a^*$ and $b^*$ may be used to define the hue and chroma of a color, where $a^*$ ranges from a negative number (green) to a positive number (red) and $b^*$ ranges from a negative number (blue) to a positive number (yellow). The additional terms of $h°$ (hue angle) and $C^*$ (chroma) are also used to further describe a given color, as is known to those skilled in the art. As such, the Munsell H, V, and C values or the CIELAB $L^*$, $a^*$, and $b^*$ values can be used to calculate a volume of color space that a specific ink set can produce, whereby the larger the color space volume the more colors the ink set is capable of producing.

Desirable properties of inkjet inks include good crusting resistance, good stability, proper viscosity, proper surface tension, little color-to-color bleed, rapid dry time, no deleterious reaction with printhead components, high solubility of the dyes in the ink vehicle, consumer safety, low strike through, high color saturation, good dot gain, and suitable color characteristics. Furthermore, the durability of the printed image, for example, light and water fastness, also contributes to the quality of a printed inkjet image.

Known inkjet inks may possess one or more of the above described properties. Few inkjet inks, however, possess all of these properties since an improvement in one property often results in the degradation of another property. Accordingly, efforts continue in developing ink formulations that have improved properties while minimizing the degradation of others. However, challenges still remain to further improve the image quality and lightfastness of inkjet inks without sacrificing pen performance and/or reliability.

SUMMARY

One aspect of the present invention provides an ink set for inkjet printing. The ink set includes a cyan ink having a first lightness value, a magenta ink having a second lightness value, and a blue ink having a third lightness value, wherein the cyan ink and the magenta ink mix to form a composite blue having a fourth lightness value, wherein the fourth lightness value is approximately twice the third lightness value.

DETAILED DESCRIPTION

In the following detailed description, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
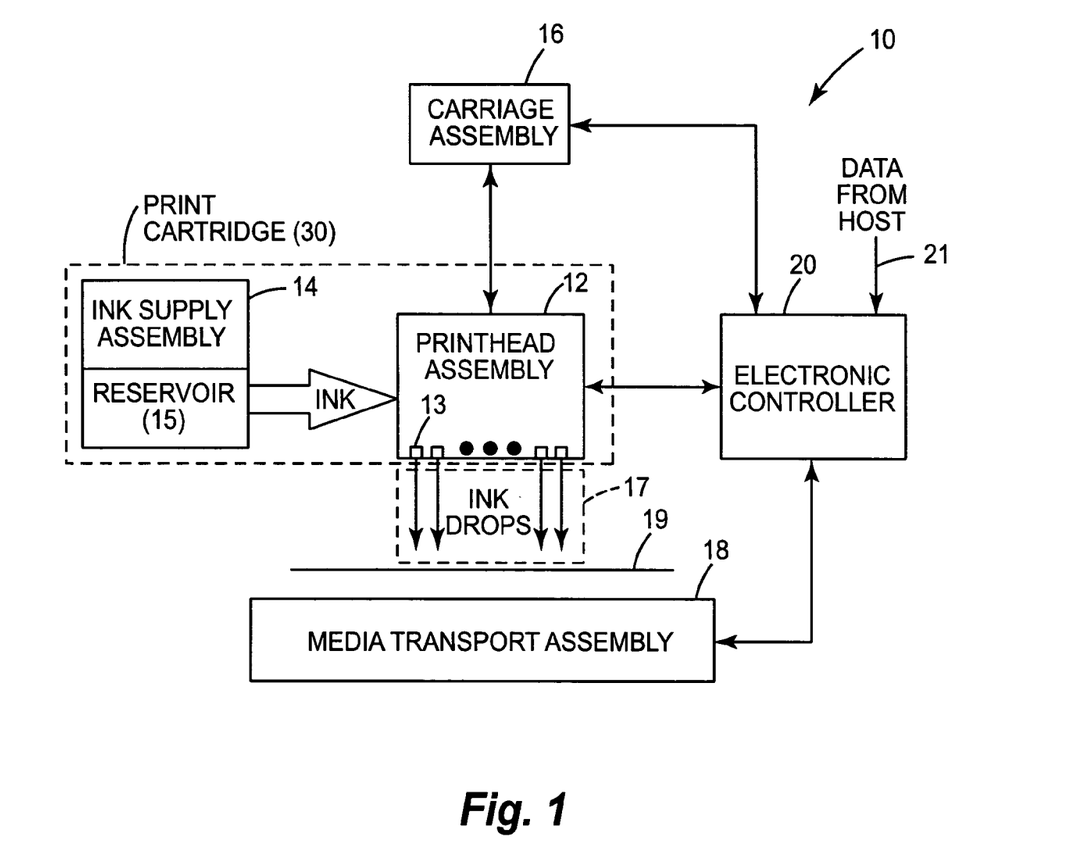
FIG. 1 is a block diagram illustrating one embodiment of an inkjet printing system.

FIG. 1 illustrates one embodiment of a portion of an inkjet printing system 10. Inkjet printing system 10 includes an inkjet printhead assembly 12, an ink supply assembly 14, a carriage assembly 16, a media transport assembly 18, and an electronic controller 20. Inkjet printhead assembly 12 includes one or more printheads which eject drops of ink through a plurality of orifices or nozzles 13.

In one embodiment, the drops of ink are directed toward a medium, such as a print media 19, so as to print onto print media 19. Nozzles 13 may be arranged in one or more columns or arrays such that properly sequenced ejection of ink from nozzles 13 causes characters, symbols, and/or other graphics or images to be printed upon print media 19 as inkjet printhead assembly 12 and print media 19 are moved relative to each other.

Print media 19 may include any type of suitable sheet material, such as paper, card stock, envelopes, labels, transparencies, Mylar, and the like. Print media 19 may include a cut-sheet material or a continuous form or continuous web print media such as a continuous roll of unprinted paper.

Ink supply assembly 14 supplies ink to inkjet printhead assembly 12 and includes a reservoir 15 for storing ink. As such, in one embodiment, ink flows from reservoir 15 to inkjet printhead assembly 12. In one embodiment, inkjet printhead assembly 12 and ink supply assembly 14 are housed together in an inkjet print cartridge or pen, as identified by dashed line 30. In another embodiment, ink supply assembly 14 is separate from inkjet printhead assembly 12 and supplies ink to inkjet printhead assembly 12 through an interface connection, such as a supply tube. In either embodiment, reservoir 15 of ink supply assembly 14 may be removed, replaced, and/or refilled.

Carriage assembly 16 positions inkjet printhead assembly 12 relative to media transport assembly 18, and media transport assembly 18 positions print media 19 relative to inkjet printhead assembly 12. As such, a print region 17 within which inkjet printhead assembly 12 deposits ink drops is defined adjacent to nozzles 13 in an area between inkjet printhead assembly 12 and print media 19. In one embodiment, print media 19 is advanced through print region 17 during printing by media transport assembly 18.

Electronic controller 20 communicates with inkjet printhead assembly 12, carriage assembly 16, and media transport assembly 18. Electronic controller 20 receives data 21 from a host system, such as a computer, and may include memory for temporarily storing data 21. Data 21 may be sent to inkjet printing system 10 along an electronic, infrared, optical or other information transfer path. Data 21 represents, for example, an image, graphics, or pattern to be printed. As such, data 21 forms a print job for inkjet printing system 10 and includes one or more print job commands and/or command parameters.

In one embodiment, electronic controller 20 provides control of inkjet printhead assembly 12 including timing control for ejection of ink drops from nozzles 13. As such, electronic controller 20 defines a pattern of ejected ink drops which form characters, symbols, and/or other graphics or images on print media 19. Timing control and, therefore, the pattern of ejected ink drops, is determined by the print job commands and/or command parameters. In one embodiment, logic and drive circuitry forming a portion of electronic controller 20 is located on inkjet printhead assembly 12. In another embodiment, logic and drive circuitry forming a portion of electronic controller is located off inkjet printhead assembly 12.

Figure 2:
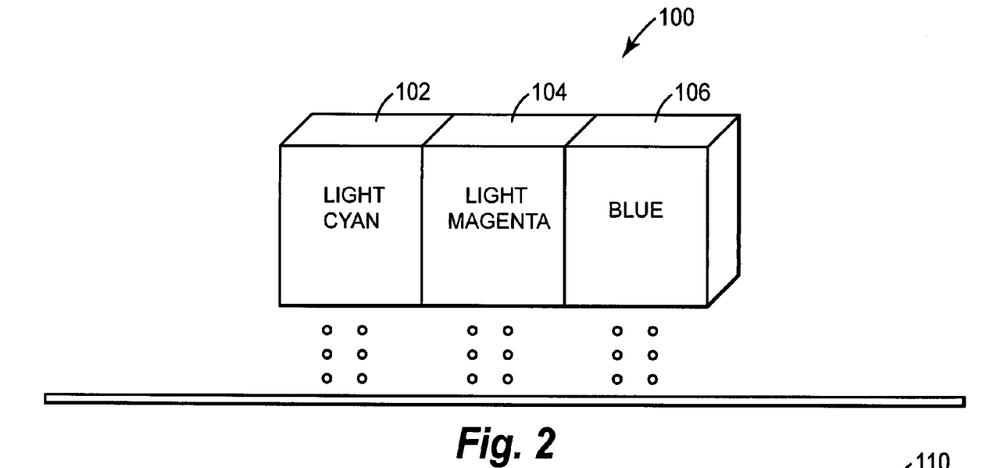
FIG. 2 is a schematic illustration of one embodiment of an ink set including light cyan ink, light magenta ink, and blue ink.

FIG. 2 illustrates one embodiment of an ink set 100 for inkjet printing system 10. In one embodiment, ink set 100 includes a light cyan (c) ink 102, a light magenta (m) ink 104, and a blue (B) ink 106. In one embodiment, light cyan ink 102, light magenta ink 104, and blue ink 106 are dye-based inks and are formulated to produce a large color gamut and have desirable lightfastness to enable the production of high-quality images. Inks formulated according to the present invention produce images having color appearances that meet desirable properties of color accuracy and durability.

In one embodiment, ink set 100 is provided by a single inkjet pen or cartridge including separate chambers for each of the inks. Thus, in one embodiment, ink set 100 is provided by a tri-chamber inkjet pen or cartridge including a chamber for light cyan ink 102, a chamber for light magenta ink 104, and a chamber for blue ink 106. In another embodiment, ink set 100 is provided by individual or separate inkjet pens or cartridges for each of the inks. Thus, in one embodiment, ink set 100 is provided by an inkjet pen including light cyan ink 102, an inkjet pen including light magenta ink 104, and an inkjet pen including blue ink 106.

Figure 3:
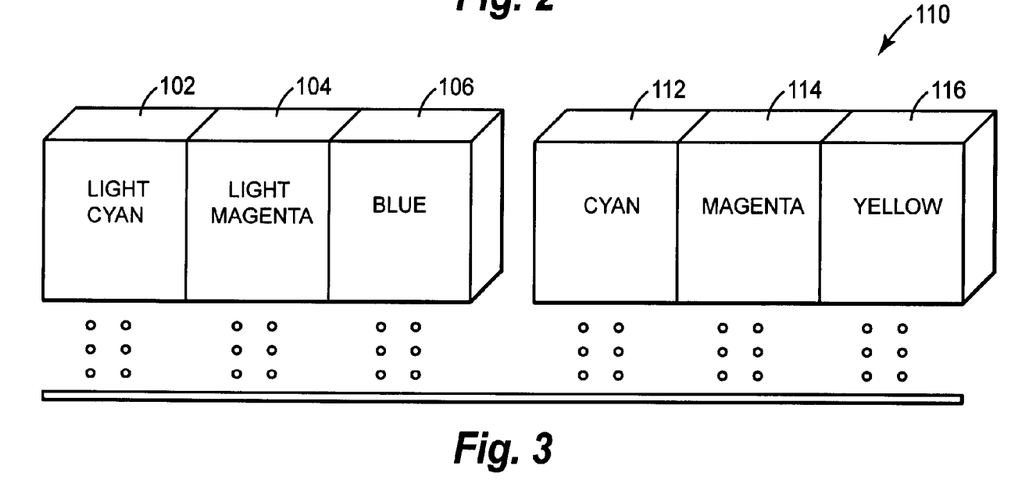
FIG. 3 is a schematic illustration of one embodiment of an ink set including light cyan ink, light magenta ink, blue ink, cyan ink, magenta ink, and yellow ink.

FIG. 3 illustrates another embodiment of an ink set 110 for inkjet printing system 10. In one embodiment, ink set 110 includes light cyan ink 102, light magenta ink 104, and blue ink 106 of ink set 100, as described above, as well as a cyan (C) ink 112, a magenta (M) ink 114, and a yellow (Y) ink 116. As such, light cyan ink 102, light magenta ink 104, blue ink 106, cyan ink 112, magenta ink 114, and yellow ink 116 form a 6-ink printing system (cmBCMY).

In one embodiment, similar to light cyan ink 102, light magenta ink 104, and blue ink 106, cyan ink 112, magenta ink 114, and yellow ink 116 of ink set 110 are dye-based inks and are formulated to produce a large color gamut and have desirable lightfastness to enable the production of high-quality images. In addition, similar to that described above with reference to ink set 100, cyan ink 112, magenta ink 114, and yellow ink 116 of ink set 110 may be provided by a single inkjet pen or cartridge including separate chambers for each of the inks or by individual or separate inkjet pens or cartridges for each of the inks.

In one embodiment, the light inks of ink set 100 and the corresponding inks of ink set 110, namely light cyan ink 102 and cyan ink 112 and light magenta ink 104 and magenta ink 114 of ink sets 100 and 110, respectively, are distinguished by dye load. For example, in one embodiment, light cyan ink 102 of ink set 100 has a dye load of approximately 0.1 percent to approximately 2.0 percent by weight and light magenta ink 104 of ink set 100 has a dye load of approximately 0.1 percent to approximately 2.0 percent by weight. In addition, cyan ink 112 of ink set 110 has a dye load of approximately 2.0 percent to approximately 10.0 percent by weight and magenta ink 114 of ink set 110 has a dye load of approximately 2.0 percent to approximately 10.0 percent by weight.

In one embodiment, the light inks of ink set 100, namely light cyan ink 102 and light magenta ink 104, and the corresponding inks of ink set 110, namely cyan ink 112 and magenta ink 114, are distinguished by printed lightness values. In one embodiment, the lightness values are L* values as defined by the CIELAB color space system. The CIELAB color space system is based upon standards promulgated by the International Committee on Illumination or CIE (Commission Internationale de' L'Eclairage) in 1976. According to such standards, an L* value of 100 generally equals an ideal diffused perfectly white reflector. As such, with the CIELAB system, L* defines the lightness of a color and ranges from 0 (black) to 100 (white).

In one embodiment, the light inks of ink set 100 have printed lightness values greater than those of the corresponding inks of ink set 110. More specifically, light cyan ink 102 and light magenta ink 104 of ink set 100 have respective lightness values and cyan ink 112 and magenta ink 114 of ink set 110 have respective lightness values such that the lightness values of light cyan ink 102 and light magenta ink 104 are greater than the respective lightness values of cyan ink 112 and magenta ink 114. In one embodiment, for example, light cyan ink 102 and light magenta ink 104 each have a lightness L* value of approximately 60 to approximately 85, and cyan ink 112 and magenta ink 114 each have a lightness L* value of approximately 35 to approximately 55.

In one embodiment, light cyan ink 102 and light magenta ink 104 of ink set 100 mix to form a composite blue on print media 19. Accordingly, the composite blue has a printed lightness value. As such, in one embodiment, formulations of light cyan ink 102, light magenta ink 104, and/or blue ink 106 are selected such that blue ink 106 has a lightness value that is approximately one-half the lightness value of the composite blue formed by light cyan ink 102 and light magenta ink 104. Conversely, the lightness value of the composite blue formed by light cyan ink 102 and light magenta ink 104 is approximately twice the lightness value of blue ink 106. Thus, light cyan ink 102, light magenta ink 104, and blue ink 106 of ink set 100 may be used to print a wide range of lightness values.

In one embodiment, when used in a 6-ink printing system (cmBCMY) as described above, blue ink 106 of ink set 100 is mixed with yellow ink 116 of ink set 110 to form black on print media 19. As such, a separate inkjet pen or chamber of an inkjet pen including black ink may be excluded from the printing system thus increasing versatility of the printing system.

Figure 4:
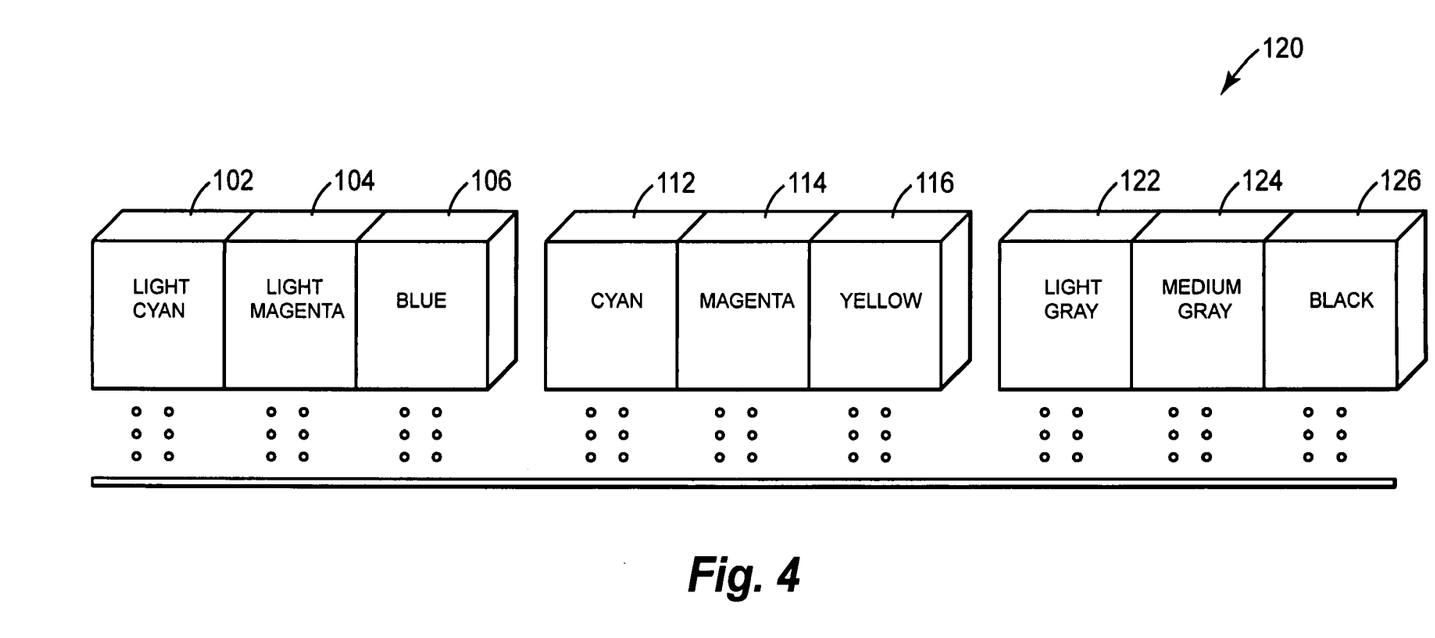
FIG. 4 is a schematic illustration of one embodiment of an ink set including light cyan ink, light magenta ink, blue ink, cyan ink, magenta ink, yellow ink, light gray ink, medium gray ink, and black.

FIG. 4 illustrates another embodiment of an ink set 120 for inkjet printing system 10. In one embodiment, ink set 120 includes light cyan ink 102, light magenta ink 104, and blue ink 106 of ink set 100, as described above, cyan ink 112, magenta ink 114, and yellow ink 116 of ink set 110, as described above, as well as a light gray (g) ink 122, a medium gray (G) ink 124, and a black (z) ink 126. As such, light cyan ink 102, light magenta ink 104, blue ink 106, cyan ink 112, magenta ink 114, yellow ink 116, light gray ink 122, medium gray ink 124, and black ink 126 form a 9-ink printing system (cmBCMYgGz).

In one embodiment, light gray ink 122, medium gray ink 124, and black ink 126 are dye-based inks and are formulated to produce a large color gamut and have desirable lightfastness to enable the production of high-quality images. In addition, similar to that described above with reference to ink sets 100 and 110, light gray ink 122, medium gray ink 124, and black ink 126 of ink set 120 may be provided by a single inkjet pen or cartridge including separate chambers for each of the inks or provided by individual or separate inkjet pens or cartridges for each of the inks.

In one embodiment, light gray ink 122, medium gray ink 124, and black ink 126 of ink set 120 are distinguished by printed lightness values. More specifically, in one embodiment, light gray ink 122 has a lightness value greater than that of medium gray ink 124, and medium gray ink 124 has a lightness value greater than that of black ink 126. In one embodiment, the lightness values are L* values of the CIELAB color space system, as described above. In one embodiment, for example, light gray ink 122 has a lightness L* value of approximately 50 to approximately 70, medium gray ink 124 has a lightness L* value of approximately 25 to approximately 50, and black ink 126 has a lightness L* value of approximately 0 to approximately 5.

In one embodiment, blue ink 106 of ink set 100 is selected so as to have a relatively high chroma. Chroma refers to the relative colorfulness of a given color. More specifically, chroma is known in the art as the colorfulness of an area judged in proportion to the brightness of a similarly illuminated area that appears to be white. In the CIELAB system, chroma (C*) is defined by the following equation:

$$C^* = (a^{*2} + b^{*2})$$

where a* ranges from a negative number (green) to a positive number (red) and b* ranges from a negative number (blue) to a positive number (yellow). In addition, in the CIELAB system, hue or hue angle (h°) is defined by the following equation:

$$h° = \tan^{-1} b^*/a^*$$

In one embodiment, as described below, a formulation of blue ink 106 is selected such that blue ink 106 has a chroma C* value of approximately 60 to approximately 90. In one exemplary embodiment, the chroma C* value of blue ink 106 is approximately 80. In addition, in one embodiment, the lightness L* value of blue ink 106 is approximately 25 to approximately 35 and the hue h° value of blue ink 106 is approximately 270 to approximately 290. In one exemplary embodiment, the lightness L* value of blue ink 106 is approximately 27 and the hue h° value of blue ink 106 is approximately 288.

In one embodiment, blue ink 106 of ink set 100 includes a mixture of a phthalocyanine dye and a rhodamine magenta dye in an ink vehicle. Ink vehicles are well known in the art and refer to the vehicle in which a colorant, such as a selected dye or dyes, is placed to form the ink. A wide variety of ink vehicles in varying amounts may be used with the ink formulations of the present invention. Such ink vehicles may include a mixture of a variety of different components including, for example, ingredients such as solvents, buffers, biocides, viscosity modifiers, surface-active agents (surfactants), salts, metal chelators, and water.

In one embodiment, the formulation of blue ink 106 is defined by a percent by weight of the selected dyes. In one embodiment, for example, the amount of phthalocyanine dye is between about 2 percent by weight and about 4 percent by weight of the ink formulation. In addition, the amount of rhodamine magenta dye is between about 1 percent by weight and about 2 percent by weight of the ink formulation. In one exemplary embodiment, the amount of phthalocyanine dye is about 3.5 percent by weight of the ink formulation. In addition, the amount of rhodamine magenta dye is about 1.5 percent by weight of the ink formulation.

In one embodiment, the phthalocyanine dye of blue ink 106 is a cyan dye having a more bluish hue. Examples of phthalocyanine dyes suitable for blue ink 106 include Direct Blue 199 (DB199) dyes having the following structure:

wherein each R group is independently H, $SO_3H$, $SO_2NH_2$, or $SO_2NH$-alkyl-$OH_2$, with the proviso that an average of from 2 to 6 R groups are other than H. In one embodiment, the phthalocyanine dye is a sulfonated dye with a degree of aggregation of the cyan being increased by tuning the degree of substitution by sulfoneamine, sulfoneamide, and sulfate groups. In one exemplary embodiment, the phthalocyanine dye is DB199.

In one embodiment, the rhodamine magenta dye of blue ink 106 has a purple hue. Examples of rhodamine magenta dyes suitable for blue ink 106 include Acid Red 52, Acid Red 289, Acid Red 388, and mixtures thereof. In one exemplary embodiment, the rhodamine magenta dye of blue ink 106 is Acid Red 52 (AR52) available, for example, from Avecia Limited, Manchester, UK.

In one embodiment, the ink formulation of blue ink 106 also includes a metal-stabilized or metalized magenta dye. The metalized magenta dye, for example, helps stabilize the rhodamine magenta dye from light fade. A metalized magenta dye is defined as a magenta dye which includes a metal ion complex. Various methods for complexing metal ions to organic chemical groups, such as by chelation, are known to those skilled in the art. Furthermore, a variety of metal ions, such as nickel, copper, cobalt, and iron may be used to create the metal ion complex.

In one embodiment, the metalized magenta dye is a copper- or nickel-containing azo dye. In one embodiment, the amount of metalized magenta dye is between about 0.1 percent by weight and about 10 percent by weight of the ink formulation.

With respect to the copper- or nickel-containing azo dye, any functional dye that meets these criteria can be used. Examples include CI Reactive Red 23, and CI Reactive Red 23 in the pacified form. An example of such a Reactive Red 23 in the pacified form includes the following structure:

wherein each M can be H or a monovalent ion such as Na$^+$, Li$^+$, K$^+$, NH$_4^+$, and combinations thereof. Alternative examples include nickel metalized naphthol azo triazole dyes, and dyes having the following structure:

wherein M can be H or a monovalent ion such as Na$^+$, Li$^+$, K$^+$, NH$_4^+$, and combinations thereof. Though the dye(s) shown above are functionalized with SO$_3$ (or SO$_3$M) groups at specific locations, this is provided by example only. One skilled in the art would recognize that other solubilizing groups or other locations can be functionalized with similar success. Such modifications are included herein. As mentioned, the copper- or nickel-containing azo dye can be a single copper- or nickel-containing azo dye, or can be at least two copper- or nickel-containing azo dyes blended together.

EXAMPLES

Different inks were formulated and qualities of the formulated inks were measured in an effort to assess the benefits of the present invention. Namely, the effect of different amounts of each dye component on the values of lightness, chroma, and hue was measured. In one embodiment, three different ink formulations were prepared having the following compositions:

TABLE 1

Ink Formulation 1.1

| Ingredient | Wt % |
|---|---|
| DYES | |
| Phthalocyanine dye | 2.3 |
| Acid Red 52 Na | 1.0 |
| COMPONENTS | |
| 2-ethyl-2-hydroxymethyl-1,3-propane diol | 7.50 |
| 2-Pyrrolidone | 6.50 |
| 1,5 Pentanediol | 8.00 |
| Tergitol 15-S-7 | 1.00 |
| Tergitol 15-S-5 | 1.00 |
| MES Sodium salt | 0.20 |
| DOWFAX8390 | 0.40 |
| EDTA Na2 | 0.0075 |
| Mg(NO3)2*6H20 | 3.00 |
| Water to | 100 |

TABLE 2

Ink Formulation 1.2

| Ingredient | Wt % |
|---|---|
| DYES | |
| Phthalocyanine dye | 2.875 |
| Acid Red 52 Na | 1.25 |
| COMPONENTS | |
| 2-ethyl-2-hydroxymethyl-1,3-propane diol | 7.50 |
| 2-Pyrrolidone | 6.50 |
| 1,5 Pentanediol | 8.00 |
| Tergitol 15-S-7 | 1.00 |
| Tergitol 15-S-5 | 1.00 |
| MES Sodium salt | 0.20 |
| DOWFAX8390 | 0.40 |
| EDTA Na2 | 0.0075 |
| Mg(NO3)2*6H20 | 3.00 |
| Water to | 100 |

TABLE 3

Ink Formulation 1.3

| Ingredient | Wt % |
|---|---|
| DYES | |
| Phthalocyanine dye | 3.45 |
| Acid Red 52 Na | 1.50 |
| COMPONENTS | |
| 2-ethyl-2-hydroxymethyl-1,3-propane diol | 7.50 |
| 2-Pyrrolidone | 6.50 |
| 1,5 Pentanediol | 8.00 |
| Tergitol 15-S-7 | 1.00 |
| Tergitol 15-S-5 | 1.00 |
| MES Sodium salt | 0.20 |
| DOWFAX8390 | 0.40 |
| EDTA Na2 | 0.0075 |
| Mg(NO3)2*6H20 | 3.00 |
| Water to | 100 |

While all of the inks had the same ink vehicles and included a phthalocyanine dye and a rhodamine magenta dye of Acid Red 52, each had different weight percentages of phthalocyanine dye and Acid Red 52. For example, ink formulation 1.1 had 2.3 percent by weight phthalocyanine dye and 1.0 percent by weight Acid Red 52, ink formulation 1.2 had 2.875 percent by weight phthalocyanine dye and 1.25 percent by weight Acid Red 52, and ink formulation 1.3 had 3.45 percent by weight phthalocyanine dye and 1.50 percent by weight Acid Red 52.

Lightness (L*), chroma (C*), and hue (h°) for each of the ink formulations identified above was measured and is provided in Table 4 below. As shown in Table 4, chroma is increased with the ink formulation 1.3.

TABLE 4

Color Comparison

| Ink Formulation | Lightness (L*) | Chroma (C*) | Hue (h°) |
|---|---|---|---|
| 1.1 | 34.8 | 75.6 | 284.7 |
| 1.2 | 31.26 | 78.44 | 286.45 |
| 1.3 | 27.7 | 80.6 | 288 |

Figure 5:
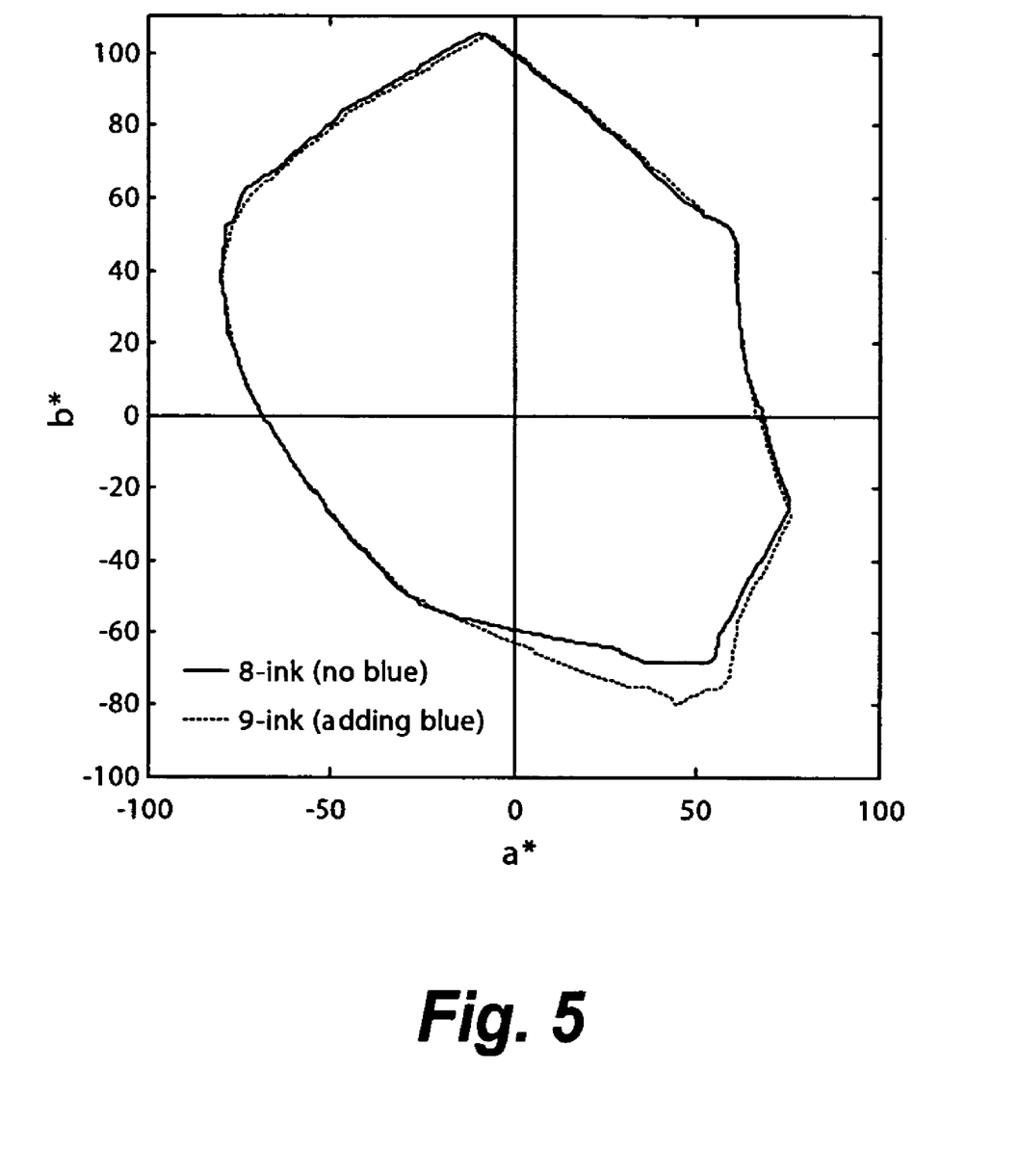
FIG. 5 is a graph of one embodiment of a color space of an ink set according to the present invention.

FIG. 5 illustrates one embodiment of a color space for an ink set including a cmB ink set, such as ink set 100 including high chroma blue ink 106 as described above, as compared with an ink set devoid of blue ink 106. As noted from the graph, the color gamut or volume of the color space is expanded with blue ink 106 in the ink set.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An ink set for inkjet printing, the ink set comprising:
    a cyan ink having a first lightness value;
    a magenta ink having a second lightness value; and
    a blue ink having a third lightness value, wherein the cyan ink and the magenta ink mix to form a composite blue having a fourth lightness value, wherein the fourth lightness value of the composite blue is approximately twice the third lightness value of the blue ink.
2. The ink set of claim 1, wherein the blue ink has a chroma C* value of approximately 60 to approximately 90.
3. The ink set of claim 1, wherein the blue ink has a lightness L* value of approximately 25 to approximately 35.
4. The ink set of claim 1, herein the blue ink has a hue h° value of approximately 270 to approximately 290.
5. The ink set of claim 1, wherein the cyan ink, the magenta ink, and the blue ink are dye-based inks.
6. The ink set of claim 1, further comprising:
    a cyan ink having a lightness value less than the first lightness value;
    a magenta ink having a lightness value less than the second lightness value; and
    a yellow ink.
7. The ink set of claim 6, wherein the blue ink and the yellow ink mix to form a black ink.
8. The ink set of claim 1, further comprising:
    a gray ink having a fifth lightness value;
    a gray ink having a sixth lightness value less than the fifth lightness value; and
    a black ink.
9. An ink set for inkjet printing, the ink set comprising:
    a cyan ink having a dye load of approximately 0.1 percent to approximately 2.0 percent by weight;
    a magenta ink having a dye load of approximately 0.1 percent to approximately 2.0 percent by weight; and
    a blue ink having a chroma C* value of approximately 60 to approximately 90
    wherein the cyan ink and the magenta ink mix to form a composite blue wherein a lightness value of the blue ink is approximately one-half of a lightness value of the composite blue.
10. The ink set of claim 9, wherein the blue ink has a lightness L* value of approximately 25 to approximately 35.
11. The ink set of claim 9, wherein the blue ink has a hue h° value of approximately 270 to approximately 290.
12. The ink set of claim 9, further comprising:
    a cyan ink having a dye load of approximately 2.0 percent to approximately 10 percent by weight;
    a magenta ink having a dye load of approximately 2.0 percent to approximately 10.0 percent by weight; and
    a yellow ink.
13. The ink set of claim 12, wherein the blue ink and the yellow ink mix to form a black ink.
14. The ink set of claim 9, further comprising:
    a gray ink having a first lightness value;
    a gray ink having a second lightness value less than the first lightness value; and
    a black ink.
15. An inkjet printer, comprising:
    a first inkjet pen including a light cyan ink having a first lightness value, a light magenta ink having a second lightness value, and a high chroma blue ink,
    wherein a chrome C* value of the blue ink is approximately 60 to approximately 90,
    wherein the light cyan ink and the light magenta ink mix to form a composite blue,
    wherein a lightness value of the blue ink is approximately one-half of a lightness value of the composite blue.
16. The inkjet printer of claim 15, wherein a lightness L* value of the blue ink is approximately 25 to approximately 35.
17. The inkjet printer of claim 15, wherein a hue h° value of the blue ink is approximately 270 to approximately 290.

18. The inkjet printer of claim 15, wherein the light cyan ink, the light magenta ink, and the blue ink are dye-based inks.

19. The inkjet printer of claim 15, further comprising:
a second inkjet pen including a cyan ink having a third lightness value less than the first lightness value of the light cyan ink, a magenta ink having a fourth lightness value less than the second lightness value of the light magenta ink, and a yellow ink.

20. The inkjet printer of claim 19, wherein the blue ink of the first inkjet pen and the yellow ink of the second inkjet pen mix to form a black ink.

21. The inkjet printer of claim 19, wherein the inkjet printer is devoid of an inkjet pen including a black ink.

22. The inkjet printer of claim 19, further comprising:
a third inkjet pen including a light gray ink having a fifth lightness value, a medium gray ink having a sixth lightness value less than the fifth lightness value, and a black ink.

23. A method of inkjet printing on a print media, the method comprising:
providing a first ink set including a light cyan ink having a first lightness value, a light magenta Ink having a second lightness value, and a blue ink having a chroma C* value of approximately 60 to approximately 90;
ejecting drops of at least one of the light cyan ink, the light magenta ink, and the blue ink on the print media; and
forming composite blue on the print media, including ejecting light cyan ink and light magenta ink, wherein a lightness value of the composite blue is approximately twice a lightness value of the blue ink.

24. The method of claim 23, wherein the blue ink has a lightness L* value of approximately 25 TA) approximately 35.

25. The method of claim 23, wherein the blue ink has a hue h° value of approximately 270 to approximately 290.

26. The meted of claim 23, further comprising:
providing a second ink set including a cyan ink having a third lightness value less than the first lightness value of the light cyan ink, a magenta ink having a fourth lightness value less than the second lightness value of the light magenta ink, and a yellow ink,
wherein ejecting drops includes ejecting drops of at least one of the light cyan ink, the light magenta ink, the blue ink, the cyan ink, the magenta ink, and the yellow ink on the print media.

27. The method of claim 26, further comprising:
forming black on the print media, including ejecting blue ink of the first ink set and yellow ink of the second ink set.

28. The method of claim 26, further comprising:
providing a third ink set including a light gray ink having a fifth lightness value, a medium gray ink having a sixth lightness value less than the fifth lightness value, and a black ink,
wherein ejecting drops includes ejecting drops of at least one of the light cyan ink, the light magenta ink, the blue ink, the cyan ink, the magenta ink, the yellow ink, the light gray ink, the medium gray ink, and the black ink on the print media.

29. The ink set of claim 1, wherein the cyan ink has a first lightness value of approximately 60 to approximately 85, the magenta ink has a second lightness value of approximately 60 to approximately 85, and the blue ink has a third lightness value of approximately 25 to approximately 35.

30. The inkjet printer of claim 15, wherein the light cyan ink has a first lightness value of approximately 60 to approximately 85, the light magenta ink has a second lightness value of approximately 60 to approximately 85, and the blue ink has a lightness value of approximately 25 to approximately 35.

31. The method of claim 23, wherein the light cyan ink has a first lightness value of approximately 60 in approximately 85, the light, magenta ink has a second lightness value of approximately 60 in approximately 85, and the blue ink has a lightness value of approximately 25 to approximately 35.

* * * * *

UNITED STATES PATENT AND TRADEMARK OFFICE
CERTIFICATE OF CORRECTION

PATENT NO. : 7,188,943 B2 Page 1 of 1
APPLICATION NO. : 10/891628
DATED : March 13, 2007
INVENTOR(S) : Gondek et al.

It is certified that error appears in the above-identified patent and that said Letters Patent is hereby corrected as shown below:

In the Claims

Col. 10 (line 31) claim 9, delete "90" and insert therefor --90,--.

Col. 11 (line 23) claim 23, delete "Ink" and insert therefor --ink--.

Col. 11 (line 33) claim 24, delete "TA)" and insert therefor --to--.

Col. 11 (line 37) claim 26, delete "meted" and insert therefor --method--.

Signed and Sealed this

Ninth Day of October, 2007

JON W. DUDAS
*Director of the United States Patent and Trademark Office*